United States Patent
Adachi et al.

(10) Patent No.: US 9,098,336 B2
(45) Date of Patent: *Aug. 4, 2015

(54) MULTI-THREAD PROCESSOR AND ITS HARDWARE THREAD SCHEDULING METHOD

(75) Inventors: Koji Adachi, Kanagawa (JP); Teppei Oomoto, Kanagawa (JP)

(73) Assignee: RENESAS ELECTRONICS CORPORATION, Kawasaki-Shi, Kanagawa (JP)

( * ) Notice: Subject to any disclaimer, the term of this patent is extended or adjusted under 35 U.S.C. 154(b) by 233 days.

This patent is subject to a terminal disclaimer.

(21) Appl. No.: 13/619,530

(22) Filed: Sep. 14, 2012

(65) Prior Publication Data

US 2013/0013900 A1    Jan. 10, 2013

Related U.S. Application Data

(63) Continuation of application No. 12/585,879, filed on Sep. 28, 2009, now Pat. No. 8,365,179.

(30) Foreign Application Priority Data

Sep. 30, 2008 (JP) ................................. 2008-252234

(51) Int. Cl.
G06F 9/46 (2006.01)
G06F 9/50 (2006.01)
G06F 9/38 (2006.01)

(52) U.S. Cl.
CPC ............ *G06F 9/5027* (2013.01); *G06F 9/3838* (2013.01); *G06F 9/3851* (2013.01); *G06F 9/3857* (2013.01); *G06F 2209/507* (2013.01)

(58) Field of Classification Search
None
See application file for complete search history.

(56) References Cited

U.S. PATENT DOCUMENTS 5,928,322 A * 7/1999 Bitar et al. .................... 718/103
6,389,449 B1 5/2002 Nemirovsky et al.

(Continued)

FOREIGN PATENT DOCUMENTS

JP 2002-540505 A 11/2002
JP 2006-155480 A 6/2006

(Continued)

OTHER PUBLICATIONS

United States Office Action dated Aug. 20, 2012 in U.S. Appl. No. 12/585,879.
United States Office Action dated Jan. 13, 2012 in U.S. Appl. No. 12/585,879.
Japanese Office Action dated Jul. 17, 2012 (English Translation Thereof).
Notification of Reasons for Refusal dated Dec. 3, 2013 with English translation.
Japanese Office Action dated Jan. 20, 2015 with a partial English translation thereof.

*Primary Examiner* — Gregory A Kessler
(74) *Attorney, Agent, or Firm* — McGinn IP Law Group, PLLC

(57) ABSTRACT

A multi-thread processor includes a plurality of hardware threads each of which generates an independent instruction flow, a first thread scheduler that outputs a first thread selection signal, the first thread selection signal designating a hardware thread to be executed in a next execution cycle among the plurality of hardware threads according to a priority rank, the priority rank being established in advance for each of the plurality of hardware threads, a first selector that selects one of the plurality of hardware threads according to the first thread selection signal and outputs an instruction generated by the selected hardware thread, and an execution pipeline that executes an instruction output from the first selector. Whenever the hardware thread is executed in the execution pipeline, the first scheduler updates the priority rank for the executed hardware thread and outputs the first thread selection signal in accordance with the updated priority rank.

5 Claims, 13 Drawing Sheets

(56) References Cited

U.S. PATENT DOCUMENTS

| | | |
|---|---|---|
| 6,658,654 B1 | 12/2003 | Berry et al. |
| 7,631,308 B2 | 12/2009 | Bishop et al. |
| 7,664,936 B2 | 2/2010 | Jensen et al. |
| 7,765,546 B2 | 7/2010 | Nemirovsky et al. |
| 7,774,563 B2 | 8/2010 | Raghavan |
| 2004/0215936 A1 | 10/2004 | Ambekar et al. |
| 2005/0081214 A1 | 4/2005 | Nemirovsky et al. |
| 2006/0037025 A1 | 2/2006 | Janssen et al. |
| 2006/0117316 A1 | 6/2006 | Cismas et al. |
| 2006/0123420 A1 | 6/2006 | Nishikawa |
| 2006/0179279 A1 | 8/2006 | Jones |
| 2007/0083735 A1 | 4/2007 | Glew |
| 2010/0257534 A1 | 10/2010 | Cismas et al. |
| 2011/0314477 A1* | 12/2011 | Zhong .......................... 718/103 |

FOREIGN PATENT DOCUMENTS

| | | |
|---|---|---|
| JP | 2007-058331 A | 3/2007 |
| JP | 2007-317171 A | 12/2007 |
| JP | 2008-52750 A | 3/2008 |
| JP | 2008-522290 A | 6/2008 |
| JP | 2008-530655 A | 8/2008 |

* cited by examiner

INSTRUCTION 1   add   a1,b1,c1   :a1+b1=c1
INSTRUCTION 2   LD    d1,0x0(a1) :ACCESS TO DATA MEMORY
INSTRUCTION 3   sub   e1,d1,b1   :e1-b1=b1
Fig. 4
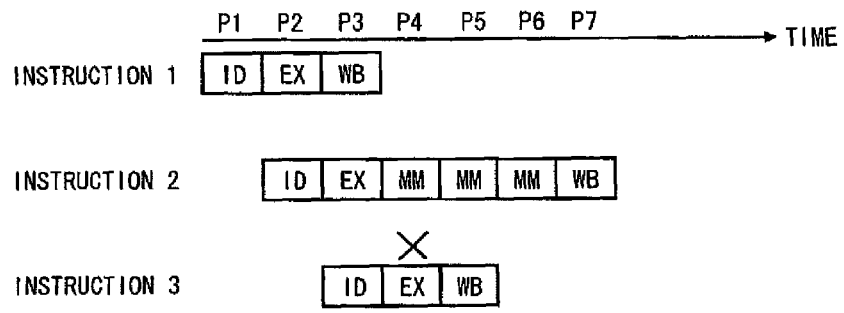
Fig. 5
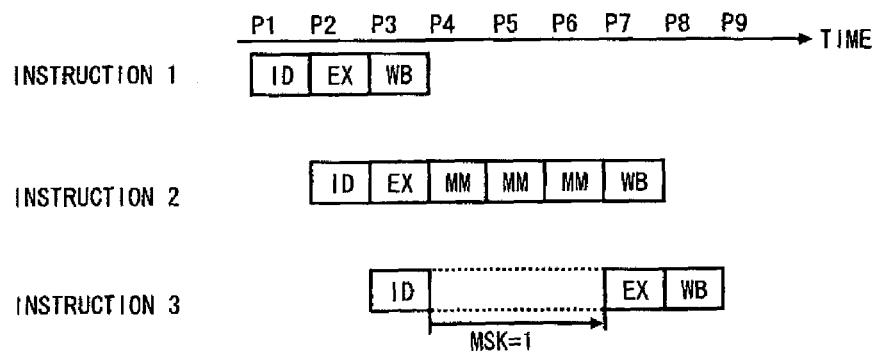
Fig. 6

| TIME | COUNT VALUE | | | | MASK SIGNAL | | | | DISPATCH COUNT VALUE | | | | TSEL |
|---|---|---|---|---|---|---|---|---|---|---|---|---|---|
| | CNT0 | CNT1 | CNT2 | CNT3 | MSK0 | MSK1 | MSK2 | MSK3 | DCNT0 | DCNT1 | DCNT2 | DCNT3 | |
| t1 | 3 | 4 | 2 | 1 | 0 | 0 | 0 | 0 | 3 | 4 | 2 | 1 | THREAD 1 |
| t2 | 3 | 3 | 2 | 1 | 0 | 0 | 0 | 0 | 3 | 3 | 2 | 1 | THREAD 0 |
| t3 | 2 | 3 | 2 | 1 | 0 | 0 | 0 | 0 | 2 | 3 | 2 | 1 | THREAD 1 |
| t4 | 2 | 2 | 2 | 1 | 0 | 0 | 0 | 0 | 2 | 2 | 2 | 1 | THREAD 0 |
| t5 | 1 | 2 | 2 | 1 | 0 | 0 | 0 | 0 | 1 | 2 | 2 | 1 | THREAD 1 |
| t6 | 1 | 1 | 2 | 1 | 0 | 0 | 0 | 0 | 1 | 1 | 2 | 1 | THREAD 2 |
| t7 | 1 | 1 | 1 | 1 | 0 | 0 | 0 | 0 | 1 | 1 | 1 | 1 | THREAD 0 |
| t8 | 0 | 0 | 1 | 1 | 0 | 0 | 0 | 0 | 0 | 0 | 1 | 1 | THREAD 1 |
| t9 | 0 | 0 | 1 | 1 | 0 | 0 | 0 | 0 | 0 | 0 | 1 | 1 | THREAD 2 |
| t10 | 0 | 0 | 0 | 1 | 0 | 0 | 0 | 0 | 0 | 0 | 0 | 1 | THREAD 3 |
| t11 | 3 | 4 | 2 | 1 | 0 | 0 | 0 | 0 | 3 | 4 | 2 | 1 | THREAD 1 |
| t12 | 3 | 3 | 2 | 1 | 0 | 0 | 0 | 0 | 3 | 3 | 2 | 1 | THREAD 0 |
| t13 | 2 | 3 | 2 | 1 | 0 | 0 | 0 | 0 | 2 | 3 | 2 | 1 | THREAD 1 |
| t14 | 2 | 2 | 2 | 1 | 0 | 0 | 0 | 0 | 2 | 2 | 2 | 1 | THREAD 0 |
| t15 | 1 | 2 | 2 | 1 | 0 | 0 | 0 | 0 | 1 | 2 | 2 | 1 | THREAD 1 |
| t16 | 1 | 1 | 2 | 1 | 0 | 0 | 0 | 0 | 1 | 1 | 2 | 1 | THREAD 2 |
| t17 | 1 | 1 | 1 | 1 | 0 | 0 | 0 | 0 | 1 | 1 | 1 | 1 | THREAD 0 |
| t18 | 0 | 0 | 1 | 1 | 0 | 0 | 0 | 0 | 0 | 0 | 1 | 1 | THREAD 1 |
| t19 | 0 | 0 | 1 | 1 | 0 | 0 | 0 | 0 | 0 | 0 | 1 | 1 | THREAD 2 |
| t20 | 0 | 0 | 0 | 1 | 0 | 0 | 0 | 0 | 0 | 0 | 0 | 1 | THREAD 3 |

Fig. 9

| TIME | COUNT VALUE | | | | MASK SIGNAL | | | | DISPATCH COUNT VALUE | | | | TSEL |
|---|---|---|---|---|---|---|---|---|---|---|---|---|---|
| | CNT0 | CNT1 | CNT2 | CNT3 | MSK0 | MSK1 | MSK2 | MSK3 | DCNT0 | DCNT1 | DCNT2 | DCNT3 | |
| t1 | 3 | 4 | 2 | 1 | 0 | 0 | 0 | 0 | 3 | 4 | 2 | 1 | THREAD 1 |
| t2 | 3 | 3 | 2 | 1 | 0 | 1 | 0 | 0 | 3 | 0 | 2 | 1 | THREAD 0 |
| t3 | 2 | 3 | 2 | 1 | 0 | 1 | 0 | 0 | 2 | 0 | 2 | 1 | THREAD 0 |
| t4 | 1 | 3 | 2 | 1 | 0 | 1 | 0 | 0 | 1 | 0 | 2 | 1 | THREAD 2 |
| t5 | 1 | 3 | 1 | 1 | 0 | 0 | 0 | 0 | 1 | 3 | 1 | 1 | THREAD 1 |
| t6 | 1 | 2 | 1 | 1 | 0 | 0 | 0 | 0 | 1 | 2 | 1 | 1 | THREAD 1 |
| t7 | 1 | 1 | 1 | 1 | 0 | 0 | 0 | 0 | 1 | 1 | 1 | 1 | THREAD 0 |
| t8 | 0 | 1 | 1 | 1 | 0 | 0 | 0 | 0 | 0 | 1 | 1 | 1 | THREAD 1 |
| t9 | 0 | 0 | 1 | 1 | 0 | 0 | 0 | 0 | 0 | 0 | 1 | 1 | THREAD 2 |
| t10 | 0 | 0 | 0 | 1 | 0 | 0 | 0 | 0 | 0 | 0 | 0 | 1 | THREAD 3 |
| t11 | 3 | 4 | 2 | 1 | 0 | 0 | 0 | 0 | 3 | 4 | 2 | 1 | THREAD 1 |
| t12 | 3 | 3 | 2 | 1 | 0 | 0 | 0 | 0 | 3 | 3 | 2 | 1 | THREAD 0 |
| t13 | 2 | 3 | 2 | 1 | 1 | 0 | 0 | 0 | 0 | 3 | 2 | 1 | THREAD 1 |
| t14 | 2 | 2 | 2 | 1 | 1 | 1 | 0 | 0 | 0 | 0 | 2 | 1 | THREAD 2 |
| t15 | 2 | 2 | 1 | 1 | 0 | 1 | 0 | 0 | 2 | 0 | 1 | 1 | THREAD 0 |
| t16 | 1 | 2 | 1 | 1 | 0 | 0 | 0 | 0 | 1 | 2 | 1 | 1 | THREAD 1 |
| t17 | 1 | 1 | 1 | 1 | 0 | 0 | 0 | 0 | 1 | 1 | 1 | 1 | THREAD 0 |
| t18 | 0 | 1 | 1 | 1 | 0 | 0 | 0 | 0 | 0 | 1 | 1 | 1 | THREAD 1 |
| t19 | 0 | 0 | 1 | 1 | 0 | 0 | 0 | 0 | 0 | 0 | 1 | 1 | THREAD 2 |
| t20 | 0 | 0 | 0 | 1 | 0 | 0 | 0 | 0 | 0 | 0 | 0 | 1 | THREAD 3 |

Fig. 10

CONFIGURATION OF SLOT

| TIME | COUNT VALUE CNT | SLOT TO BE SELECTED | VALUE OF THREAD CONTROL REGISTER | | VALUE b OF SECOND THREAD SELECTION SIGNAL TSEL |
|---|---|---|---|---|---|
| | | | HW THREAD NUMBER | REAL-TIME BIT | |
| t1 | 0 | 0 | 0 | 1 | 0 |
| t2 | 1 | 1 | 1 | 1 | 1 |
| t3 | 2 | 2 | 0 | 0 | n |
| t4 | 3 | 3 | 2 | 1 | 2 |
| t5 | 4 | 4 | 1 | 1 | 1 |
| t6 | 0 | 0 | 0 | 1 | 0 |
| t7 | 1 | 1 | 1 | 1 | 1 |
| t8 | 2 | 2 | 0 | 0 | n |
| t9 | 3 | 3 | 2 | 1 | 2 |
| t10 | 4 | 4 | 1 | 1 | 1 | n = ARBITRARY THREAD NUMBER TSELa SELECTED BY THREAD SCHEDULER 19 OF FIRST EMBODIMENT

Fig. 14

| TIME | COUNT VALUE | | | | MASK SIGNAL | | | | DISPATCH COUNT VALUE | | | | TSELb | CNTa | SLT | HWT | RT | TSELb | TSEL |
|---|---|---|---|---|---|---|---|---|---|---|---|---|---|---|---|---|---|---|---|
| | CNT0 | CNT1 | CNT2 | CNT3 | MSK0 | MSK1 | MSK2 | MSK3 | DCNT0 | DCNT1 | DCNT2 | DCNT3 | | | | | | | |
| t1 | 2 | 1 | 3 | 4 | 0 | 0 | 0 | 0 | 2 | 1 | 3 | 4 | 3 | 0 | 0 | 0 | 1 | 0 | THREAD 0 |
| t2 | 1 | 1 | 3 | 4 | 0 | 0 | 0 | 0 | 1 | 1 | 3 | 4 | 3 | 1 | 1 | 1 | 1 | 1 | THREAD 1 |
| t3 | 1 | 0 | 3 | 4 | 0 | 0 | 0 | 0 | 1 | 0 | 3 | 4 | 3 | 2 | 2 | 0 | 0 | 0 | THREAD 3 |
| t4 | 1 | 0 | 3 | 3 | 0 | 0 | 0 | 0 | 1 | 0 | 3 | 3 | 2 | 3 | 3 | 2 | 1 | 2 | THREAD 2 |
| t5 | 1 | 0 | 2 | 3 | 0 | 0 | 0 | 0 | 1 | 0 | 2 | 3 | 3 | 4 | 4 | 1 | 1 | 1 | THREAD 1 |
| t6 | 1 | 0 | 2 | 3 | 0 | 0 | 0 | 0 | 1 | 0 | 2 | 3 | 3 | 0 | 0 | 0 | 1 | 0 | THREAD 0 |
| t7 | 0 | 0 | 2 | 3 | 0 | 0 | 0 | 0 | 0 | 0 | 2 | 3 | 3 | 1 | 1 | 1 | 1 | 1 | THREAD 1 |
| t8 | 0 | 0 | 2 | 3 | 0 | 0 | 0 | 0 | 0 | 0 | 2 | 3 | 3 | 2 | 2 | 0 | 0 | 0 | THREAD 3 |
| t9 | 0 | 0 | 2 | 2 | 0 | 0 | 0 | 0 | 0 | 0 | 2 | 2 | 2 | 3 | 3 | 2 | 1 | 2 | THREAD 2 |
| t10 | 0 | 0 | 1 | 2 | 0 | 0 | 0 | 0 | 0 | 0 | 1 | 2 | 3 | 4 | 4 | 1 | 1 | 1 | THREAD 1 |
| t11 | 0 | 0 | 1 | 2 | 0 | 0 | 0 | 0 | 0 | 0 | 1 | 2 | 3 | 0 | 0 | 0 | 1 | 0 | THREAD 0 |
| t12 | 0 | 0 | 1 | 2 | 0 | 0 | 0 | 0 | 0 | 0 | 1 | 2 | 3 | 1 | 1 | 1 | 1 | 1 | THREAD 1 |
| t13 | 0 | 0 | 1 | 2 | 0 | 0 | 0 | 0 | 0 | 0 | 1 | 1 | 2 | 2 | 2 | 0 | 0 | 0 | THREAD 3 |
| t14 | 0 | 0 | 0 | 1 | 0 | 0 | 0 | 0 | 0 | 0 | 0 | 1 | 3 | 3 | 3 | 2 | 1 | 2 | THREAD 2 |
| t15 | 0 | 0 | 0 | 1 | 0 | 0 | 0 | 0 | 0 | 0 | 0 | 1 | 3 | 4 | 4 | 1 | 1 | 1 | THREAD 1 |
| t16 | 0 | 0 | 0 | 1 | 0 | 0 | 0 | 0 | 0 | 0 | 0 | 1 | 3 | 0 | 0 | 0 | 1 | 0 | THREAD 0 |
| t17 | 0 | 0 | 0 | 1 | 0 | 0 | 0 | 0 | 0 | 0 | 0 | 1 | 3 | 1 | 1 | 1 | 1 | 1 | THREAD 1 |
| t18 | 0 | 0 | 0 | 1 | 0 | 0 | 0 | 0 | 0 | 0 | 0 | 1 | 3 | 2 | 2 | 0 | 0 | 0 | THREAD 3 |

Fig. 15

MULTI-THREAD PROCESSOR AND ITS HARDWARE THREAD SCHEDULING METHOD

CROSS REFERENCE TO RELATED APPLICATIONS

The present application is a Continuation of U.S. patent application Ser. No. 12/585,879, filed on Sep. 28, 2009, now U.S. Pat. No. 8,365,179 which is based on Japanese Patent Application No. 2008-252234, filed on Sep. 30, 2008, the entire contents of which is incorporated herein by reference.

BACKGROUND

1. Field of the Invention

The present invention relates to a multi-thread processor and its hardware thread scheduling method, and in particular to a multi-thread processor having a thread scheduler that schedules the execution order of a plurality of hardware threads and its hardware thread scheduling method.

2. Description of Related Art

In recent years, multi-thread processors have been proposed in order to improve the processing power of processors. A multi-thread processor has a plurality of threads each of which generates an independent instruction flow. Further, the multi-thread processor performs arithmetic processing while changing the instruction flow to be processed in the arithmetic circuit that processes instructions in pipeline processing between a plurality of instruction flows that are generated by the respective plurality of threads. At this point, the multi-thread processor can execute an instruction generated by one thread in one execution stage of the pipeline while executing an instruction generated by another thread in another execution stage. That is, in the arithmetic circuit of the multi-thread processor, instructions that are independent of each other are executed in different execution stages from each other. In this way, the multi-thread processor can process each instruction flow smoothly while reducing the time period during which no instruction is processed in an execution stage of the pipeline, and thus improving the processing power of the processor.

Japanese unexamined Patent Application Publication No. 2007-317171 discloses an example of such a multi-thread processor. The multi-thread processor described in Japanese unexamined Patent Application Publication No. 2007-317171 includes a plurality of processor elements and a parallel processor control unit that switches the thread of each processor element. Further, the parallel processor control unit counts the execution time of the thread being executed in the processor element, and when the counted time has reached the allocated time for the thread, outputs a time-out signal and switches the thread to be executed by the processor element based on the time-out signal and execution order information retained in an execution order register.

As described above, the instruction flow to be processed in the arithmetic circuit is switched between instruction flows generated by the respective threads in accordance with a schedule in the multi-thread processor. Japanese unexamined Patent Application Publication No. 2008-52750 discloses an example of such a thread scheduling method. In the multi-thread processor described in Japanese unexamined Patent Application Publication No. 2008-52750, a plurality of threads are executed in a circular manner, and each thread is executed for its allocated time in each round. That is, in Japanese unexamined Patent Application Publication No. 2008-52750, a schedule that is established in a fixed manner is executed in a circular manner, so that each thread is executed with a predefined execution time ratio.

Further, Japanese unexamined Patent Application Publication No. 2006-155480 discloses another thread scheduling method. Specifically, Japanese unexamined Patent Application Publication No. 2006-155480 discloses a round-robin method and a priority method as a thread scheduling method. In the round-robin method, threads that are put in a queue are selected and executed one by one at regular intervals. Therefore, in the round-robin method, threads in the queue are impartially assigned to and executed in the CPU at regular intervals. Further, in the priority method, threads are executed in order of their priorities. More specifically, in the priority method, a queue is established for each priority and each thread is put in one of the queues according to its priority. Then, threads are selected, and assigned to and executed in the CPU in descending order of the priority.

SUMMARY

The present inventors have found a problem that in both of the round robin method and priority method, it is impossible to flexibly establish the execution time of threads while ensuring the minimum execution time of the threads. For example, in the round-robin method, when the number of threads is increased, the execution time is reduced uniformly for each thread, and thus causing a problem that sufficient execution time cannot be allocated to threads having higher priorities. Meanwhile, the priority method has a problem that when processing for threads having higher priorities continues, thread having lower priorities cannot be processed.

A first exemplary aspect of the present invention is a multi-thread processor including: a plurality of hardware threads each of which generates an independent instruction flow; a first thread scheduler that outputs a first thread selection signal, the first thread selection signal designating a hardware thread to be executed in a next execution cycle among the plurality of hardware threads according to a priority rank, the priority rank being established in advance for each of the plurality of hardware threads; a first selector that selects one of the plurality of hardware threads according to the first thread selection signal and outputs an instruction generated by the selected hardware thread; and an execution pipeline that executes an instruction output from the first selector, wherein whenever the hardware thread is executed in the execution pipeline, the first scheduler updates the priority rank for the executed hardware thread and outputs the first thread selection signal in accordance with the updated priority rank.

Another exemplary aspect of the present invention is a hardware thread scheduling method in a multi-thread processor, the multi-thread processor including a plurality of hardware threads and being configured to execute an instruction flow generated by the hardware thread while switching the hardware thread in accordance with a predefined schedule, the hardware thread scheduling method including: selecting a hardware thread having a highest priority rank among the plurality of hardware threads; executing an instruction generated by the selected hardware thread; updating the priority rank of the hardware thread that generated the executed instruction; and selecting the hardware thread having a highest priority rank among the updated priority ranks as the hardware thread that generates an instruction next.

In accordance with a multi-thread processor and its hardware scheduling method in accordance with an exemplary aspect of the present invention, the priority rank of the executed hardware thread is updated, and the hardware thread that is selected next is determined in accordance with the updated priority rank. In this way, it is possible to prevent a certain hardware thread from being fixedly selected.

In accordance with a multi-thread processor and its hardware scheduling method in accordance with an exemplary aspect of the present invention, the execution time of hardware threads can be flexibly established while ensuring the minimum execution time of the hardware threads.

BRIEF DESCRIPTION OF THE DRAWINGS

The above and other exemplary aspects, advantages and features will be more apparent from the following description of certain exemplary embodiments taken in conjunction with the accompanying drawings, in which:

FIG. 4 shows an example of an instruction group executed in a multi-thread processor in accordance with a first exemplary embodiment of the present invention;

FIG. 5 shows a process flow of instructions in a case where no mask signal is used in a multi-thread processor in accordance with a first exemplary embodiment of the present invention;

FIG. 6 shows a process flow of instructions in a case where a mask signal is used in a multi-thread processor in accordance with a first exemplary embodiment of the present invention;

FIG. 9 is a table showing operations of a thread scheduler in accordance with a first exemplary embodiment of the present invention;

FIG. 10 is a table showing operations of a thread scheduler in accordance with a first exemplary embodiment of the present invention;

FIG. 14 is a table showing operations of a second thread scheduler in accordance with a second exemplary embodiment of the present invention; and FIG. 15 is a table showing operations of a thread scheduler in accordance with a second exemplary embodiment of the present invention.

DETAILED DESCRIPTION OF THE EXEMPLARY EMBODIMENTS

Figure 1:
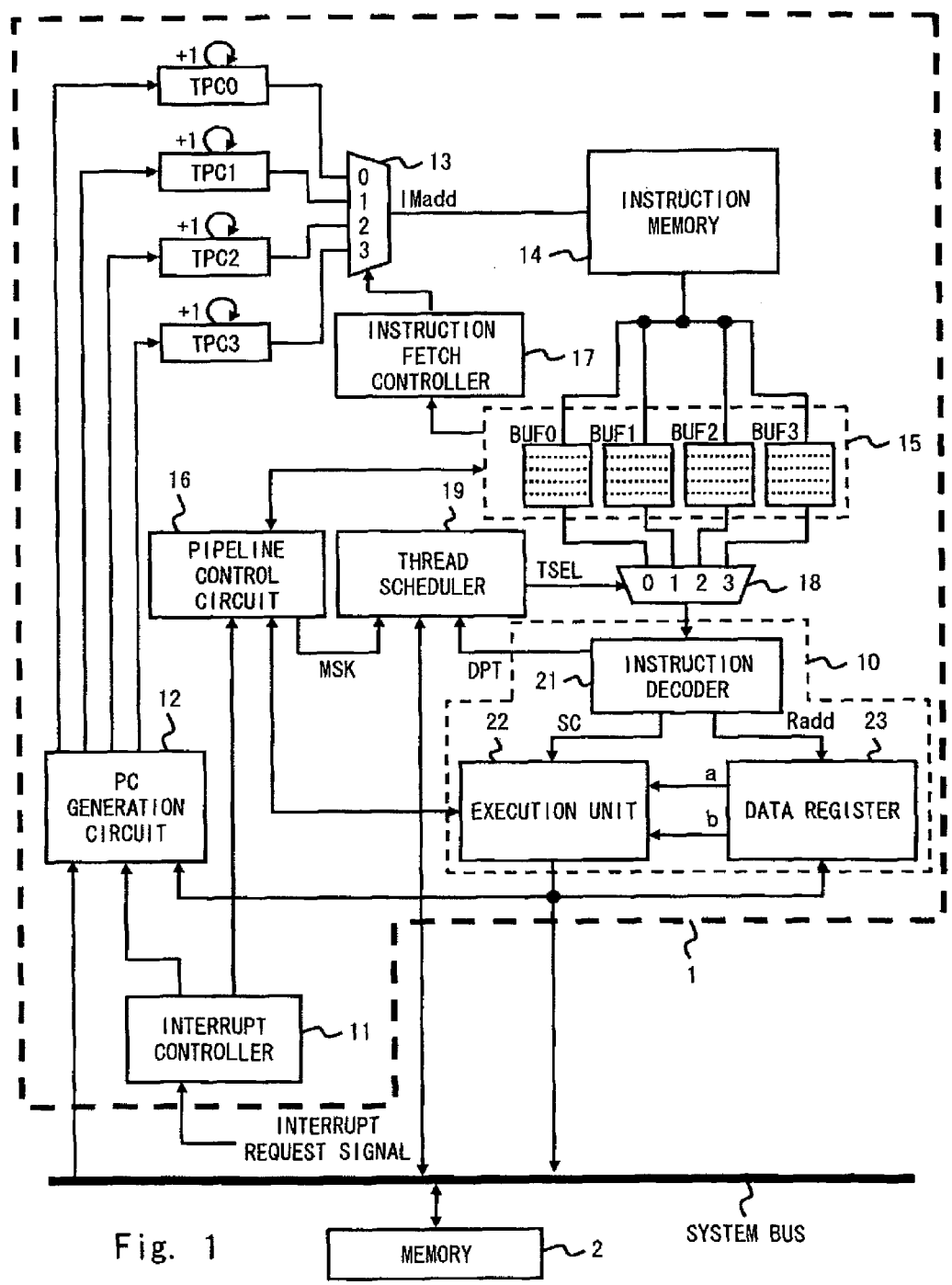
FIG. 1 is a block diagram of a multi-thread processor in accordance with a first exemplary embodiment of the present invention.

[First Exemplary Embodiment]
Exemplary embodiments of the present invention are explained hereinafter with reference to the drawings. FIG. 1 is a block diagram of a processor system including a multi-thread processor 1 in accordance with a first exemplary embodiment of the present invention. A multi-thread processor 1 is connected to a memory 2 through a system bus in a processor system in accordance with this exemplary embodiment. Note that though they are not shown in the figure, other circuits such as input/output interfaces are also connected to the system bus.

Firstly, a multi-thread processor 1 in accordance with this exemplary embodiment of the present invention is explained hereinafter. The multi-thread processor 1 includes a plurality of hardware threads. The hardware threads are composed of a group of circuits including thread program counters, an instruction memory, a general register, and a control register (it is assumed to be embedded in a pipeline control circuit 16 in this exemplary embodiment) and the like. Further, the hardware thread is a system that generates an instruction flow composed of a series of instructions that are read out from an instruction memory in accordance with instruction fetch addresses output from a thread program counter embedded in the multi-thread processor 1. That is, instructions contained in an instruction flow generated by one hardware thread are highly relevant to each other. In this exemplary embodiment of the present invention, the multi-thread processor 1 is equipped with a plurality of thread program counters. The number of hardware threads is same as the number of the thread program counters. Further details of the multi-thread processor 1 are explained hereinafter.

As shown in FIG. 1, the multi-thread processor 1 includes a execution pipeline 10, an interrupt controller 11, a PC generation circuit 12, thread program counters TPC0 to TPC3, selectors 13 and 18, an instruction memory 14, an instruction buffer 15, a pipeline control circuit 16, an instruction fetch controller 17, and a thread scheduler 19.

The execution pipeline 10 executes data processing based on an instruction generated by a hardware thread selected by the selector 18. More specifically, the execution pipeline 10 includes an instruction decoder 21, an execution unit 22, and a data register 23. The instruction decoder 21 decodes a received instruction and outputs an arithmetic control signal SC to the execution unit 22. Further, the instruction decoder 21 also outputs a data register address Radd indicating the storage location of data based on the decoding result of an instruction. The execution unit 22 performs various arithmetic operations according to the arithmetic control signal SC. Note that the execution unit 22 has a plurality of execution stages and performs arithmetic in pipeline processing. Further, an arithmetic result of execution in the execution unit 22 is transmitted to the PC generation circuit 12, the memory 2, or the data register 23 according to the type of the arithmetic operation result. The data register 23 stores data used in the execution unit 22. Further, the data register 23 outputs data located at an address specified by a data register address Radd. In the example shown in FIG. 1, the data register 23 is configured in such a form that it outputs data a and data b according to the data register address Radd. Further, the data register 23 stores an arithmetic operation result output by the execution unit 22 at an address specified by the data register address Radd.

The interrupt controller 11 receives an interrupt request signal, and outputs an interrupt instruction signal instructing the execution of interrupt processing in the multi-thread processor 1. More specifically, upon receiving an interrupt request signal, the interrupt controller 11 determines the interrupt factor and the priority of the interrupt processing and the like, and instructs the PC generation circuit 12 and the pipeline control circuit 16 to execute interrupt processing so that they carry out processing relevant to that interrupt factor. The interrupt request is also output from other circuits in addition to the one output from the multi-thread processor 1.

The PC generation circuit 12 receives a new program instruction signal input through the system bus, an interrupt instruction signal output from the interrupt controller 11, and a branch instruction signal output based on processing on the execution unit 22, and generates a program count update value. Then, the PC generation circuit 12 provides the program count update value to one of the thread program counters TPC0 to TPC3. Note that the PC generation circuit 12 also has a function of determining which one of the thread program counters TPC0 to TPC3 the generated program count update value is provided to.

The thread program counters TPC0 to TPC3 generate an address in the instruction memory 14 at which an instruction to be processed is stored (hereinafter, this address is referred to as "instruction fetch address IMadd"). Further, when a program count update value is provided from the PC generation circuit 12 to the thread program counters TPC0 to TPC3, the thread program counters TPC0 to TPC3 update the instruction fetch address IMadd according to the program count update value. On the other hand, when no program count update value is input to the thread program counters TPC0 to TPC3, they calculate a next consecutive instruction fetch address by calculating the address in ascending order. Note that although four thread program counters are shown in FIG. 1, the number of program thread counters may be determined arbitrarily according to the specifications of the multi-thread processor.

The selector 13 selects one of the thread program counters TPC0 to TPC3 according to a thread designation signal output from the instruction fetch controller, and outputs the instruction fetch address IMadd output from the selected thread program counter. Note that numerical signs 0 to 4 affixed to the input terminals of the selector 13 in FIG. 1 indicate hardware thread numbers.

The instruction memory 14 is a memory area used in common by a plurality of hardware threads. Various instructions that are to be used in arithmetic operations performed in the multi-thread processor 1 are stored in the instruction memory 14. Furthermore, the instruction memory 14 outputs an instruction specified by an instruction fetch address IMadd input through the selector 13. At this point, the instruction memory 14 determines which one of the thread program counters TPC0 to TPC3 has output the instruction fetch address IMadd selected by the selector 13, and changes the output destination of the instruction based on the determination result. In this exemplary embodiment of the present invention, the instruction buffer 15 includes instruction buffer areas BUF0 to BUF3 corresponding to the thread program counters TPC0 to TPC3. Therefore, the instruction memory 14 distributes the read instruction to one of the instruction buffer areas BUF0 to BUF3 according to the output source of the instruction fetch address IMadd. Note that the instruction memory 14 may be a predefined memory area contained in the memory 2. Further, the instruction buffer areas BUF0 to BUF3 are a FIFO (First In First Out) type buffer circuit. Furthermore, the instruction buffer areas BUF0 to BUF3 may be configured by dividing an area of one buffer, or may be formed in separated areas.

The pipeline control circuit 16 monitors an instruction stored at the top of the instruction buffer 15 and an instruction being executed in the execution unit 22. Further, when an interrupt instruction signal is input from the interrupt controller 11 to the pipeline control circuit 16, the pipeline control circuit 16 instructs the instruction buffer 15 and the execution unit 22 to discard the instruction that belongs to the hardware thread relating to the interrupt processing. Further, the pipeline control circuit 16 verifies the dependency relation between the instruction stored at the top of the instruction buffer 15 and the instruction being executed in the execution unit 22. Then, if it is determined that there is a high dependency relation between the instructions, it outputs a mask signal MSK notifying of the hardware thread number of a hardware thread to which the instruction belongs.

The instruction fetch controller 17 determines which hardware thread the instruction to be fetched belongs to according to the number of instructions stored in the instruction buffer 15, and outputs a thread designation signal based on the determination result. For example, when the number of instructions in the instruction queue stored in the instruction buffer area BUF0 is smaller than those stored in the other instruction buffer areas, the instruction fetch controller 17 determines that the instruction belonging to 0th hardware thread should be fetched and outputs a thread designation signal indicating the 0th hardware thread. Therefore, the selector 13 selects the thread program counter TPC0. Note that the instruction fetch controller 17 may determine a hardware thread to be selected by using procedure based on a round robin method.

The selector 18 is a selector that functions as a first selector. The selector 18 selects one of the instruction buffer areas BUF0 to BUF3 according to a thread selection signal TSEL output from the thread scheduler 19, and outputs an instruction read from the selected instruction buffer area to the execution pipeline 10. That is, the selector 18 selects one hardware thread from a plurality of hardware threads according to a thread selection signal TSEL, and outputs an instruction output from the selected hardware thread to the execution pipeline 10. Note that numerical signs 0 to 4 affixed to the input terminals of the selector 18 also indicate hardware thread numbers.

The thread scheduler 19 outputs a thread selection signal TSEL that specifies one hardware thread to be executed in the next execution cycle among a plurality of hardware threads according to a pre-established schedule. That is, the thread scheduler 19 manages in what order a plurality of hardware threads are processed with a schedule, and outputs the thread selection signal TSEL so that instructions generated by hardware threads are executed in the order according to that schedule. Note that in a multi-thread processor 1 in accordance with this exemplary embodiment of the present invention, this schedule is established by a management program that is executed immediately after the multi-thread processor 1 is started up. Further, when the thread scheduler 19 receives a mask signal MSK from the pipeline control circuit 16, the thread scheduler 19 selects a hardware thread other than the hardware thread corresponding to the hardware thread number indicated by the received mask signal MSK. Furthermore, the thread scheduler 19 also receives a dispatch signal DPT from the instruction decoder 21. The dispatch signal DPT is used to notify of the assigned number of the hardware thread to which the instruction processed (dispatched) by the instruction decoder 21 belongs.

The multi-thread processor 1 in accordance with this exemplary embodiment of the present invention has a characteristic feature, particularly, in the hardware thread scheduling method performed in the thread scheduler 19. The thread scheduler 19 itself and its scheduling method are explained hereinafter.

Figure 2:
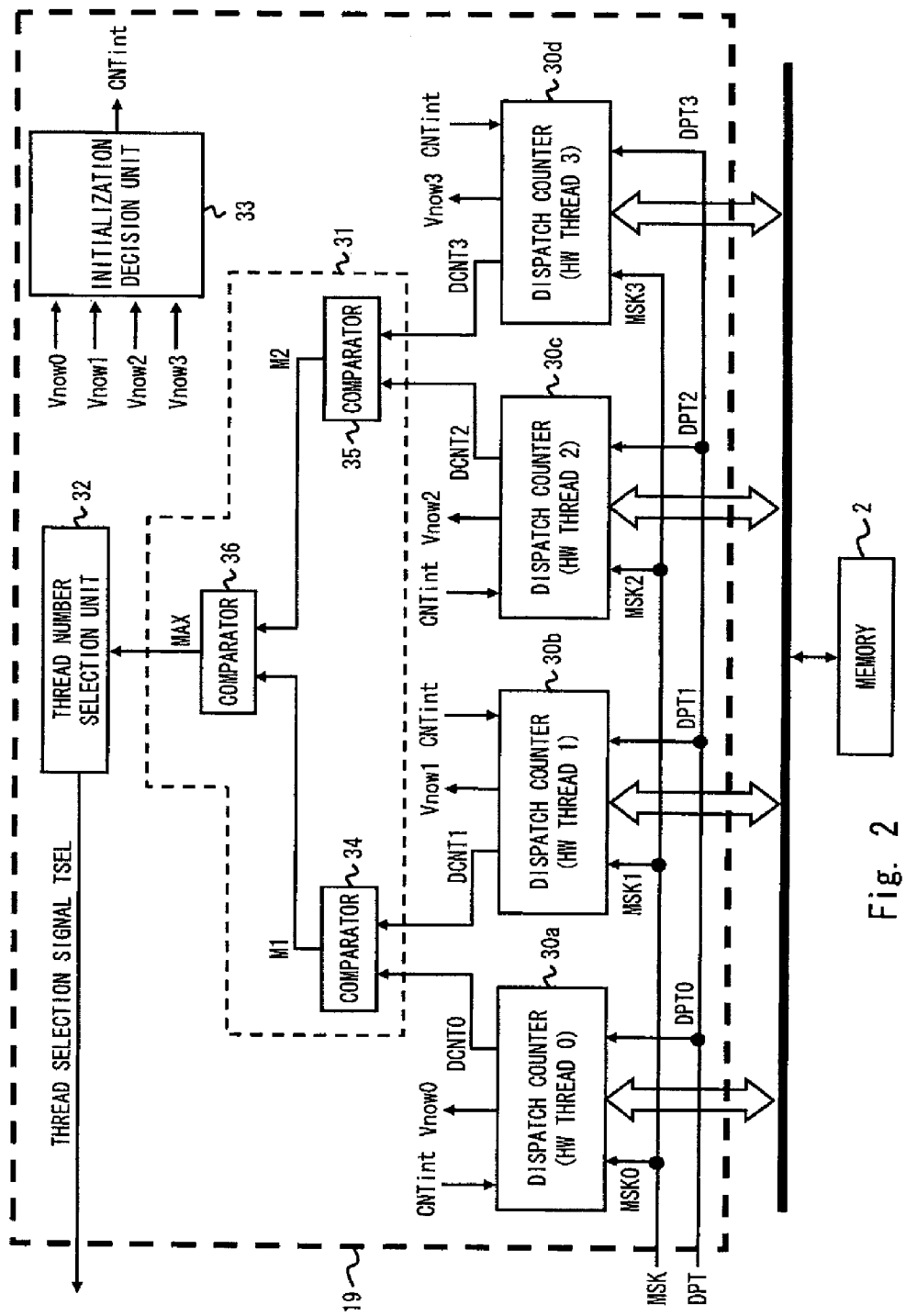
FIG. 2 is a block diagram of a thread scheduler in accordance with a first exemplary embodiment of the present invention.

FIG. 2 shows a block diagram of a thread scheduler 19. As shown in FIG. 2, the thread scheduler 19 includes dispatch counters 30a to 30d, a priority rank decision unit 31, a thread number selection unit 32, and an initialization decision unit 33. Note that since the multi-thread processor 1 has four hardware threads in this exemplary embodiment of the present invention, the thread scheduler 19 is configured to determine the order of four hardware threads. However, when the number of hardware threads is changed, the number of dispatch counters may be also changed to conform to the number of hardware threads. Further, the configuration of other circuit blocks may be also modified in accordance with the number of dispatch counters.

Each of the dispatch counters 30a to 30d is provided so as to correspond to one of a plurality of hardware threads. The dispatch counters 30a to 30d retain their respective dispatch count values DCNTs corresponding to the priority ranks for the corresponding hardware threads (including dispatch count values DCNT0 to DCNT 3 in FIG. 2). Then, each of the dispatch counters 30a to 30d receives a dispatch signal DPT and counts the number of instruction executions (the number of dispatches) belonging to a hardware thread corresponding to that particular dispatch counter. More specifically, when a hardware thread number notified by a dispatch signal DPT indicates one of the hardware threads, the dispatch counters 30a to 30d decrement a dispatch count number DCNT corresponding to that hardware thread. The initial values of the dispatch count values DCNTs are set by a management program that is executed when the multi-thread processor 1 is started up. Further, the initial values for the dispatch count value DCNT are read from a memory by the management program, and the read values are set as the initial values.

Further, the dispatch counters 30a to 30d receive mask signals MSKs (including mask signals MSK0 to MSK3) and an initialization signal CNTint and output current count values Vnows (including current count values Vnow0 to Vnow3). When a mask signal MSK is input to the dispatch counters 30a to 30d, the dispatch counters 30a to 30d set a dispatch count value DCNT of a hardware thread corresponding to the mask signal MSK to a minimum priority rank (e.g., 0). When the initialization signal CNTint is input to the dispatch counters 30a to 30d, the dispatch counters 30a to 30d reset the dispatch count values DCNTs to the initial values. Note that the initialization signal CNTint is output from the initialization decision unit 33. The dispatch counters 30a to 30d outputs the dispatch count values DCNTs based on the count values CNTs retained therein, and also outputs these count values CNTs themselves as current count values Vnows. A detailed configuration of the dispatch counters 30a to 30d will be explained later.

The priority rank decision unit 31 refers dispatch count values DCNTs output from the dispatch counters 30a to 30d, and determines a hardware thread having the highest priority rank by determining a dispatch count value DCNT indicating the highest priority rank. More specifically, the priority rank decision unit 31 includes comparators 34 to 36. Each of the comparators 34 to 36 receives two values, and selects and outputs the larger one of the two values. At this point, the comparators 34 to 36 also output information about the dispatch counter that output the selected value. Further, when the input two values are equal to each other, each of the comparators 34 to 36 selects and outputs one of the values in accordance with a predetermined rule.

More specifically, the comparator 34 receives a dispatch count value DCNT0 output from the dispatch counter 30a and a dispatch count value DCNT1 output from the dispatch counter 30b, and outputs the larger one of these two dispatch count values as a high-priority hardware thread value M1. The comparator 35 receives a dispatch count value DCNT2 output from the dispatch counter 30c and a dispatch count value DCNT3 output from the dispatch counter 30d, and outputs the larger one of these two dispatch count values as a high-priority hardware thread value M2. The comparator 36 receives the high-priority hardware thread value M1 output from the comparator 34 and the high-priority hardware thread value M2 output from the comparator 35, and outputs the larger one of these two high-priority hardware thread values as a high-priority hardware thread value MAX. Note that the high-priority hardware thread values M1, M2, and MAX are appended with values indicating dispatch counters that output those high-priority hardware thread values.

The thread number selection unit 32 selects a hardware thread associated with the dispatch counter that output the high-priority hardware thread value MAX output from the priority rank decision unit 31, and outputs a hardware thread number indicating the selected hardware thread as a thread selection signal TSEL.

The initialization decision unit 33 receives current count values Vnow0 to Vnow3 (count values CNTs retained in the dispatch counters to output the dispatch count values DCNTs), and outputs a initialization signal CNTint when the combination of the current count values Vnow0 to Vnow3 satisfies a predefined condition that is established in advance. The predefined condition in this exemplary embodiment of the present invention is assumed to be a condition that the current count values Vnow0 to Vnow3 all become zero.

Figure 3:
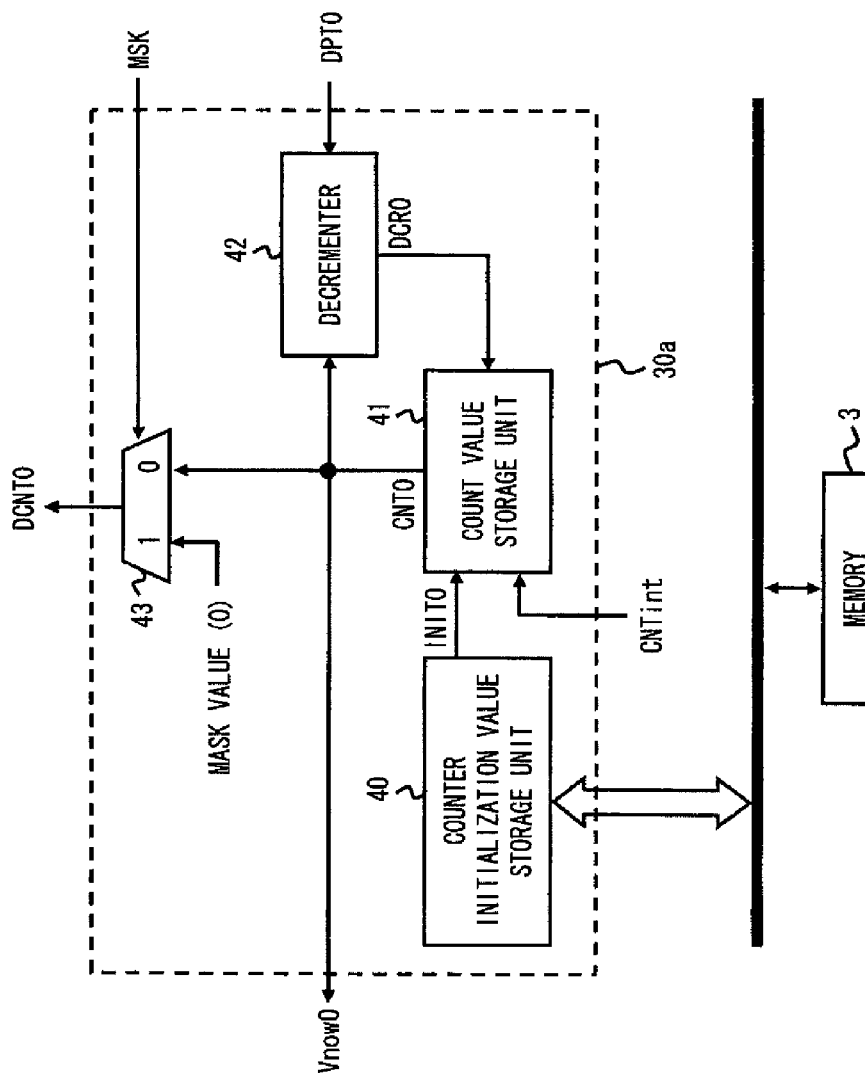
FIG. 3 is a block diagram of a dispatch counter in accordance with a first exemplary embodiment of the present invention.

Next, a detailed configuration of the dispatch counters 30a to 30d is explained hereinafter. Note that since the dispatch counters 30a to 30d have the same configurations, the configurations of the dispatch counters is explained by taking the dispatch counter 30a as an example. FIG. 3 shows a block diagram of the dispatch counter 30a. As shown in FIG. 3, the dispatch counter 30a includes a counter initialization value storage unit 40, a count value storage unit 41, a decrementer 42, and a second selector (e.g., selector 43).

The counter initialization value storage unit 40 stores a counter initialization value INIT0 for the dispatch count value DCNT output from the dispatch counter 30a. This counter initialization value INIT0 is a value read from the memory 2 by the management program. The count value storage unit 41 stores a count value CNT0. Further, the count value storage unit 41 reads a counter initialization value INIT0 in response to the initialization signal CNTint and uses it as the initial value for the count value CNT0. This count value CNT0 is output to the selector 43, to the initialization decision unit 33 as a current count value Vnow0, and also to the decrementer 42. The decrementer 42 decrements the count value CNT0 every time the dispatch signal DPT0 is input. Then, the decrementer 42 outputs the decremented count value as a writing-back value DCR0, and updates the count value CNT0 with the writing-back value DCR0. The selector 43 selects one of a mask value indicating the minimum priority rank (e.g., 0) and the count value CNT0 according to the mask signal MSK, and outputs the selected value as a dispatch signal DPT0.

The mask signal MSK is explained hereinafter. The mask signal MSK is output when the pipeline control circuit 16 verifies the dependency relation between an instruction stored at the top of the instruction buffer 15 and an instruction being executed in the execution unit 22 and determines that there is a high dependency relation between the instructions.

Further, the pipeline control circuit 16 prevents the instruction having the high dependency relation with the instruction being executed in the execution unit 22 from being read before the processing of the instruction being executed in the execution unit 22 is sufficiently completed by using this mask signal MSK.

To explain the state where this mask signal MSK is output, FIG. 4 shows an example of an instruction group generated by a single hardware thread. FIG. 4 shows an example of an instruction group which is composed of instructions 1 to 3 and in which the instructions 2 and 3 have a high dependency relation. The instruction 1 is an addition instruction with which a value in a register a1 is added to a value in a register b1 and the resulting added value is stored in a register c1. The instruction 2 is a load instruction with which data at an address 0x0(a1) in the memory 2 is loaded into a register d1. The instruction 3 is a subtraction instruction with which a value in a register d1 is subtracted from a value in a register e1 and the resulting subtracted value is stored in a register b1.

However, a problem arises when each instruction in the instruction group shown in FIG. 4 is issued in succession while no mask signal MSK is output, and it is explained hereinafter with reference to FIG. 5. FIG. 5 is a timing chart showing an instruction process flow when the instructions 1 to 3 are issued in succession. The instructions 1 to 3 are processed in a decoding stage ID, an execution stage EX, and a writing-back stage WB. Furthermore, the instruction 2 has a memory access waiting stage during which access to the memory 2 is executed. As the example shown in FIG. 5, the instruction 1 is first decoded at a time P1 and processed at a time P2, and the resulting value of the operation is written back to a register c1 at a time P3. Next, the instruction 2 is decoded at the time P2, which is later than the time P1 by one unit time, is processed at the time P3, waits for the memory access during the time P4 to P6, and the resulting value of the operation is written back to a register d1 at a time P7.

Further, the instruction 3 is decoded at the time P3, which is later than the time P2 by one unit time, is processed at the time P4, and the resulting value of the operation is written back to the register e1 at the time P5. It should be noted that the value in the register d1, which is referred to in the processing of this instruction 3, is not settled until the time P7. Therefore, the value of the register d1 that is actually read by the instruction 3 at the time P5 is different from the value that the instruction 3 is supposed to read, and thereby causing an incorrect operation result of the instruction 3.

When a result of an instruction executed in the execution unit 22 is used by a subsequent instruction in a manner described above, the pipeline control circuit 16 determines that there is a high dependency relation between the instructions and outputs a mask signal MSK. Furthermore, the pipeline control circuit 16 prevents, by using the mask signal MSK, the subsequent instruction from being issued until the processing of the preceding instructing being executed in the execution unit 22 is completed and thereby the execution unit 22 is sufficiently ready for the execution of the subsequent instruction.

Therefore, FIG. 6 shows a process timing chart of a case where a mask signal MSK is output in the process shown in the timing chart of FIG. 5. As shown in FIG. 6, by outputting a mask signal MSK (mask signal MSK=1), the execution stage EX of the instruction 3 is put in a wait state during the time P4 to P6 and executed at the time P7. In this way, the execution stage EX of the instruction 3 is kept waiting until the time P7 at which the writing-back stage WB of the instruction 2 is performed, and then performed. In this manner, the instruction 3 can read a value that the instruction 3 is supposed to read from the register d1.

As described above, the pipeline control circuit 16 controls instruction issue timing within one hardware thread by using the mask signal MSK so that each operation is correctly carried out in the execution unit 22. Note that dependency relation between instructions may arise for instructions other than loading/storing instructions for the memory 2.

Figure 7:
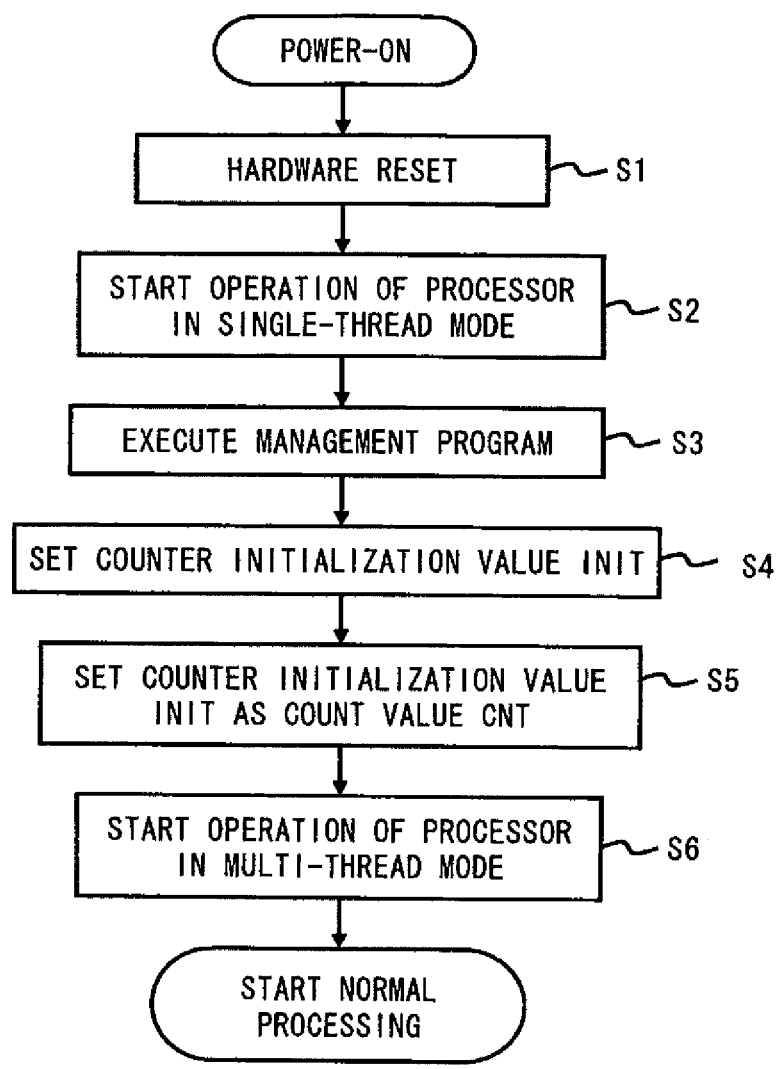
FIG. 7 is a flowchart showing operation procedure at the time when a multi-thread processor in accordance with a first exemplary embodiment of the present invention is started up.

Next, operations of the multi-thread processor 1 using the thread scheduler 19 are explained hereinafter. FIG. 7 shows a flowchart showing operation procedure from when the multi-thread processor 1 is powered on to when the normal processing is started. As shown in FIG. 7, after the power-on, the multi-thread processor 1 first initializes its circuit state by the hardware reset (step S1). Then, the multi-thread processor 1 starts operating in a single-thread (step S2). In this single-thread mode, the thread program counter TPC0, the instruction memory 14, and the instruction buffer area BUF0, for example, are activated, and other thread program counters TPC1 to TPC3 and instruction buffer areas BUF1 to BUF3 wait ready in the standby state.

Then, the multi-thread processor 1 read a management program from the memory 2 or other storage devices (not shown) and executes the management program (step S3). After that, the multi-thread processor 1 sets counter initialization values INITs in the counter initialization value storage unit 40 in accordance with the management program (step S4). Then, the dispatch counters 30a to 30d initialize the count values CNTs stored in the count value storage unit 41 with the counter initialization values INITs (step S5). After the setting of these various registers is completed, the multi-thread processor 1 starts operating in a multi-thread mode (step S6). In this multi-thread mode, the thread program counter TPC0 to TCP3, the instruction memory 14, and the instruction buffer area BUF0 to BUF3, for example, are activated. Then, the multi-thread processor 1 starts the normal operation in the multi-thread mode.

Figure 8:
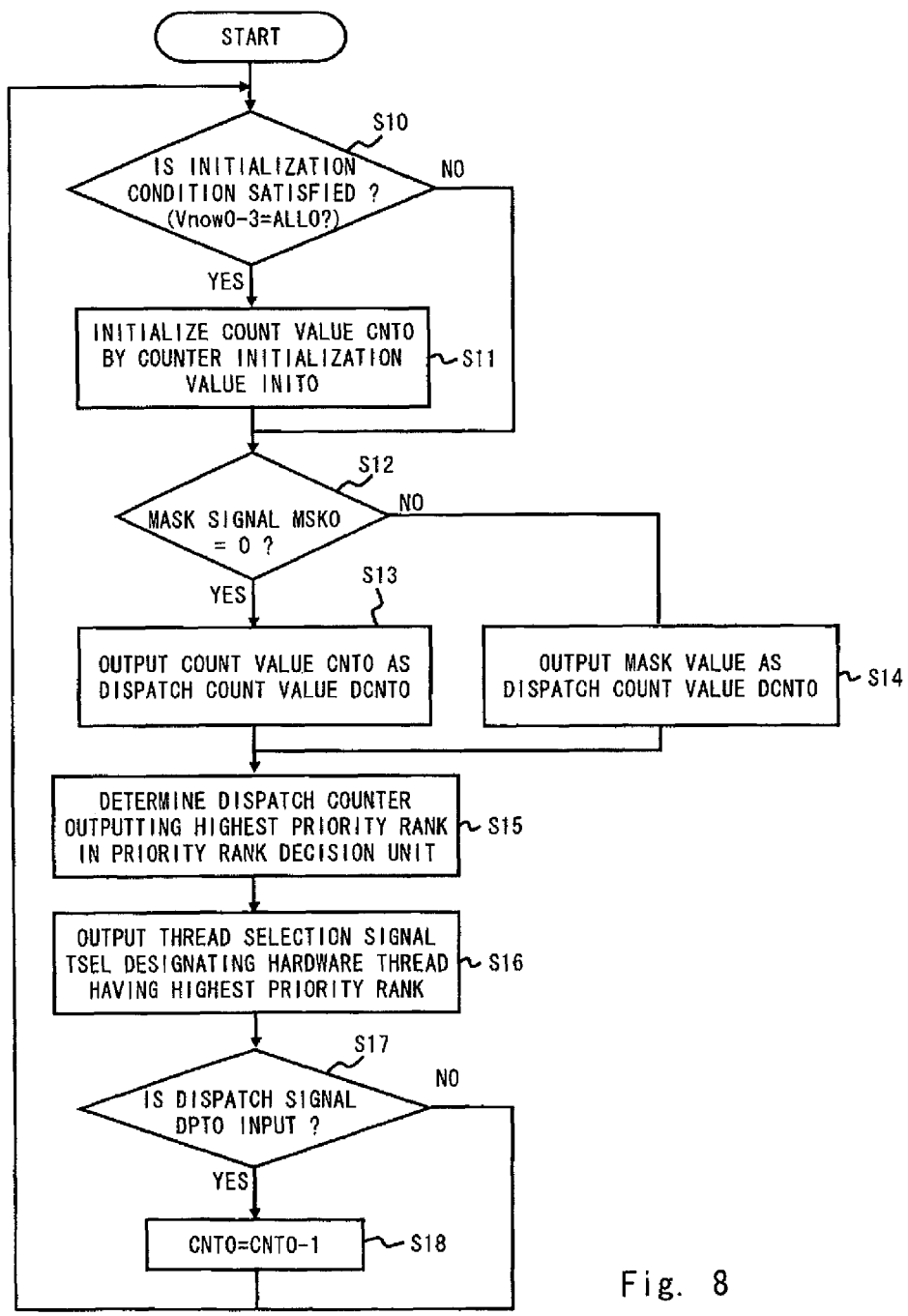
FIG. 8 is a flowchart showing operation procedure of a thread scheduler in accordance with a first exemplary embodiment of the present invention.

Next, operations of the thread scheduler 19 in the normal operation state of the multi-thread processor 1 are explained hereinafter. FIG. 8 shows a flowchart showing operations of the thread scheduler 19 in the normal operation state. The flowchart shown in FIG. 8 is explained with emphasis on the operation of the dispatch counter 30a. However, it should be noted that the dispatch counters 30b to 30d also operates in a similar manner.

As shown in FIG. 8, the thread scheduler 19 first determines whether or not the current count values Vnow0 to Vnow3 satisfy the initialization condition in the initialization decision unit 33 (step S10). Then, if it is determined that the current count values Vnow0 to Vnow3 satisfy the initialization condition in the step S10 (Yes at step S10), it initializes the count value CNT0 by using the counter initialization value INIT0 as the count value CNT0 (step S11). On the other hand, if it is determined that the current count values Vnow0 to Vnow3 do not satisfy the initialization condition in the step S10 (No at step S10), the process in the step S11 is skipped and the procedure proceeds to the next step.

In the next step, it is determined whether the value of the corresponding mask signal MSK0 is 0 or not (step S12). At this point, if the mask signal MSK0 is 0 (Yes at step S12), the dispatch counter 30a outputs the count value CNT0 as a dispatch count value DCNT (step S13). On the other hand, if the mask signal MSK0 is 1 (No at step S12), the dispatch counter 30a outputs the mask value as a dispatch count value DCNT (step S14).

Next, the thread scheduler 19 determines the dispatch counter that is outputting a dispatch count value DCNT having the highest priority rank in the priority rank decision unit 31, and outputs a high-priority hardware thread value MAX (step S15). Next, the thread scheduler 19 selects a hardware thread corresponding to the dispatch counter that is outputting the high-priority hardware thread value MAX in the thread number selection unit 32, and outputs a thread selection signal TSEL designating the selected hardware thread (step S16).

Next, the multi-thread processor 1 executes an instruction belonging to the hardware thread designated by the thread selection signal TSEL, and notifies the thread scheduler 19 of the hardware thread to which the executed instruction belongs by the dispatch signal DPT. Then, when the dispatch counter 30*a* receives the dispatch signal DPT0 (Yes at S17), the dispatch counter 30*a* decrements the count value CNT0 (step S18). After that, the thread scheduler 19 returns to the process in the step S10. On the other hand, when the dispatch counter 30*a* does not receive the dispatch signal DPT0 (No at S17), the dispatch counter 30*a* does not update the count value CNT0. After that, the thread scheduler 19 returns to the process in the step S10.

Next, FIG. 9 shows a table for explaining in what manner the thread numbers that are selected by the thread scheduler 19 are switched. In the example shown in FIG. 9, timing at which the thread is switched is defined as one unit time. Further, it is assumed that the counter initialization values of the dispatch counters 30*a* to 30*d* are 3, 4, 2 and 1 respectively. Further, the mask signal MSK always indicates 0 in the example shown in FIG. 9. In the example shown in FIG. 9, it is also assumed that the process is in the initial state at a time t1 and starts from the time t1.

At the time t1, the dispatch count values DCNT0 to DCNT3 have the same values as those of the count values CNT0 to CNT3. At this point, the maximum dispatch count value is 4 indicated by the dispatch count value DCNT1. Therefore, the thread number selection unit 32 outputs a thread selection signal TSEL indicating the 1st hardware thread corresponding to the dispatch counter 30*b* that is outputting the dispatch count value DCNT1. Then, the multi-thread processor 1 executes an instruction belonging to the 1st hardware thread, and outputs a dispatch signal DPT1 notifying that the 1st hardware thread was dispatched. Therefore, at a time t2, each of the count value CNT1 and the dispatch count value DCNT1 corresponding to the 1st hardware thread is decremented by one.

At the time t2, the dispatch count values DCNT0 to DCNT3 have the same values as those of the count values CNT0 to CNT3. At this point, the maximum dispatch count value is 3 indicated by the dispatch count values DCNT0 and DCNT1. In such a case, the comparator 34 of the priority rank decision unit 31 outputs a dispatch count value that is output from a dispatch counter corresponding to a hardware thread to which the smaller number is assigned. Therefore, the thread number selection unit 32 outputs a thread selection signal TSEL indicating the 0th hardware thread corresponding to the dispatch counter 30*a* that is outputting the dispatch count value DCNT0. Then, the multi-thread processor 1 executes an instruction belonging to the 0th hardware thread, and outputs a dispatch signal DPT0 notifying that the 0th hardware thread was dispatched. Therefore, at a time t3, each of the count value CNT0 and the dispatch count value DCNT0 corresponding to the 0th hardware thread is decremented by one.

After that, an operation like the one described above is repeated according to the count values CNTs and the dispatch count values DCNTs from the time t3 to t10. Then, by performing the processing at the time t10, all the count values CNT0 to CNT3 become 0. Therefore, after the lapse of the time t10, an initialization process is carried out by the initialization decision unit 33, and the state of the thread scheduler 19 at a time til is reset to the state of the time t1.

Next, FIG. 10 shows another example for explaining in what manner the thread numbers that are selected by the thread scheduler 19 are switched. The example of FIG. 10 illustrates a case where there is a period during which the mask signal MSK is 1 in the example shown in FIG. 9. In the example shown in FIG. 10, the execution of the 1st hardware thread selected at the time t1 brings the mask signal MSK1 corresponding the 1st hardware thread to 1 during the time t2 to t4. Therefore, the dispatch count value DCNT1 indicating the priority rank of the 1st hardware thread becomes 0 (minimum priority rank) during the time t2 to t4. Accordingly, the thread scheduler 19 selects a hardware thread other than the 1st hardware thread according to the dispatch count values DCNTs during the time t2 to t4.

Further, in the example shown in FIG. 10, the execution of the 0th hardware thread selected at a time t12 brings the mask signal MSK0 corresponding the 0th hardware thread to 1 during the time t13 to t14. Therefore, the dispatch count value DCNT0 indicating the priority rank of the 0th hardware thread becomes 0 (minimum priority rank) during the time t13 to t14. Accordingly, the thread scheduler 19 selects a hardware thread other than the 0th hardware thread according to the dispatch count values DCNTs during the time t13 to t14.

Further, in the example shown in FIG. 10, the execution of the 1st hardware thread selected at a time t13 brings the mask signal MSK1 corresponding the 1st hardware thread to 1 during the time t14 to t15. Therefore, the dispatch count value DCNT1 indicating the priority rank of the 1st hardware thread becomes 0 (minimum priority rank) during the time t14 to t15. Accordingly, the thread scheduler 19 selects a hardware thread other than the 1st hardware thread according to the dispatch count values DCNTs during the time t14 to t15. That is, during the period at the time t14, both the 0th and 1st hardware threads are excluded from the alternatives for the selection.

As explained above, the thread scheduler 19 used in the multi-thread processor 1 in accordance with this exemplary embodiment of the present invention has priority orders corresponding to the respective hardware threads as dispatch count values DCNTs. Further, the thread scheduler 19 selects one of the hardware threads according to the priority ranks of the hardware threads, and outputs a thread selection signal TSEL indicating the selected hardware thread. Furthermore, the thread scheduler 19 recognizes the fact that the selected hardware thread was executed from the dispatch signal DPT, and updates the priority rank of the hardware thread according to the dispatch signal DPT. More specifically, the thread scheduler 19 selects a hardware thread having the highest priority rank, and outputs a thread selection signal TSEL indicating the selected hardware thread. Then, the thread scheduler 19 recognizes the fact that the selected hardware thread was executed from the dispatch signal DPT, and decreases the priority rank of the hardware thread according to the dispatch signal DPT.

In this way, the thread scheduler 19 in accordance with this exemplary embodiment of the present invention can preferentially select a hardware thread having a higher priority rank in the initial state while preventing the hardware thread from continuously holding the higher priority rank after that. Therefore, the thread scheduler 19 can execute a hardware thread having a higher priority rank in the initial state while securing execution periods for other hardware threads. That is, the multi-thread processor 1 using the thread scheduler 19 in accordance with this exemplary embodiment of the present invention can execute a plurality of hardware threads having different priority ranks alternately while allocating a larger processing time to hardware threads having higher priority ranks. In other words, the multi-thread processor 1 in accordance with this exemplary embodiment of the present invention can execute a plurality of hardware threads without delay regardless of the initial state of the priority ranks of the hardware threads.

The example shown in FIG. 9 is further explained hereinafter. The 1st hardware thread having the highest priority rank in the initial state has 40% of the total processing time during the time t1 to t10, and thus securing a larger processing time than those of any other hardware thread. At this point, in the multi-thread processor 1 in accordance with this exemplary embodiment of the present invention, the execution time for the 1st hardware thread is not consecutively allocated, and the 1st hardware thread and other hardware threads are alternately executed. That is, the multi-thread processor 1 in accordance with this exemplary embodiment of the present invention can prevent the processing time from being unfairly allocated to any particular one of the hardware threads, and thereby being able to execute a plurality of hardware threads without delay.

Further, the multi-thread processor 1 in accordance with this exemplary embodiment of the present invention can increase utilization efficiency of the execution stages of the execution unit 22 (or utilization efficiency of the pipeline). More specifically, when a hardware thread that is scheduled to be selected cannot be selected due to the state of the pipeline, the thread scheduler 19 in accordance with this exemplary embodiment of the present invention recognizes the state of the pipeline by the mask signal MSK. Then, the thread scheduler 19 selects a hardware thread other than the hardware thread notified by the mask signal MSK. In this way, an instruction belonging to other hardware threads can be allocated to the stages to which otherwise no instruction would be assigned, and therefore the multi-thread processor 1 in accordance with this exemplary embodiment of the present invention can increase utilization efficiency of the pipeline.

[Second Exemplary Embodiment]

Figure 11:
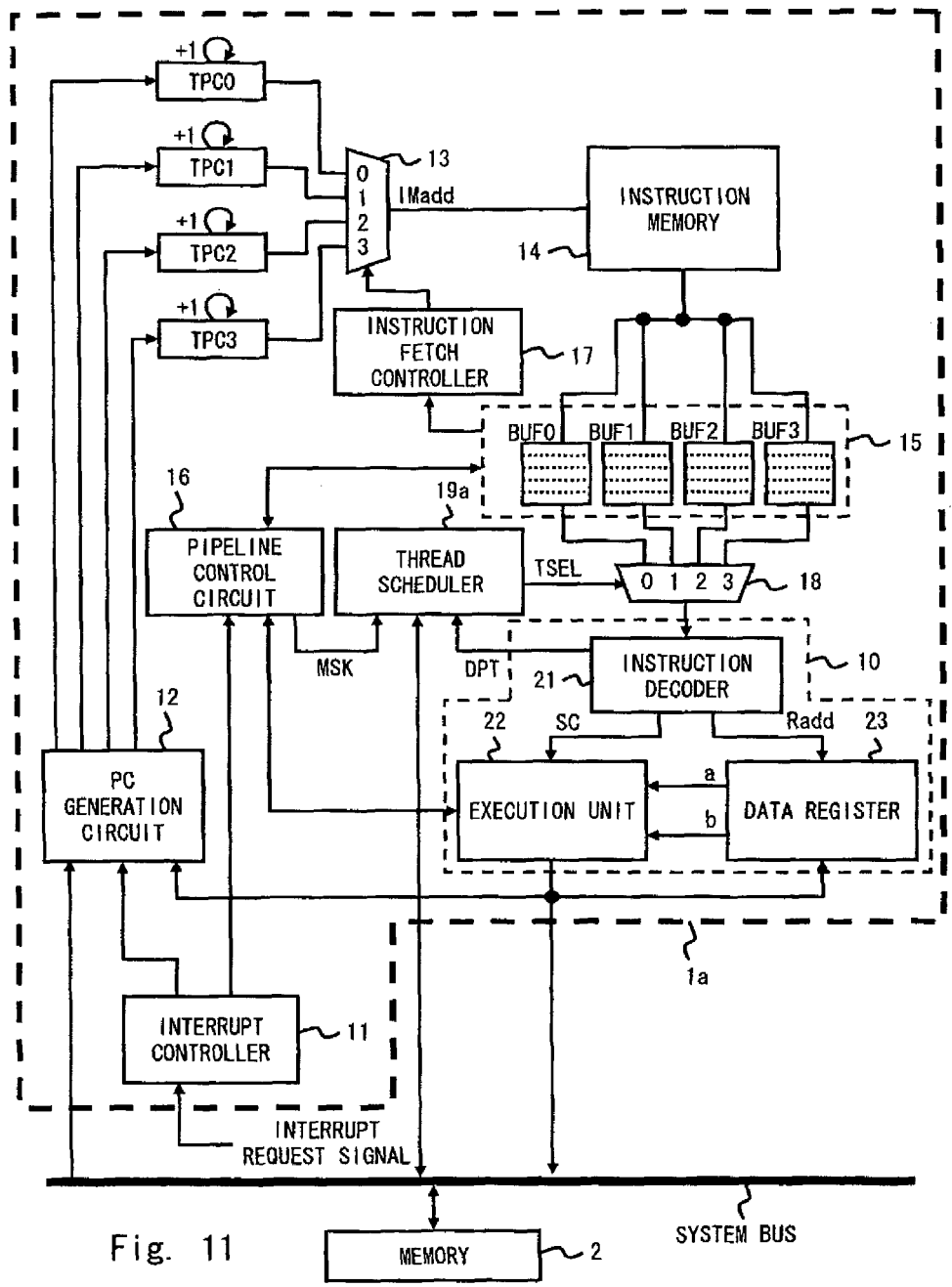
FIG. 11 is a block diagram of a multi-thread processor in accordance with a second exemplary embodiment of the present invention.

FIG. 11 shows a block diagram of a multi-thread processor 1a in accordance with a second exemplary embodiment of the present invention. As shown in FIG. 11, the multi-thread processor 1a is modified from the first exemplary embodiment by replacing the thread scheduler 19 with a scheduler 19a, i.e., a modified example of the thread scheduler 19. Therefore, the following explanation is made with emphasis on the thread scheduler 19a, and explanation of other components is omitted.

Figure 12:
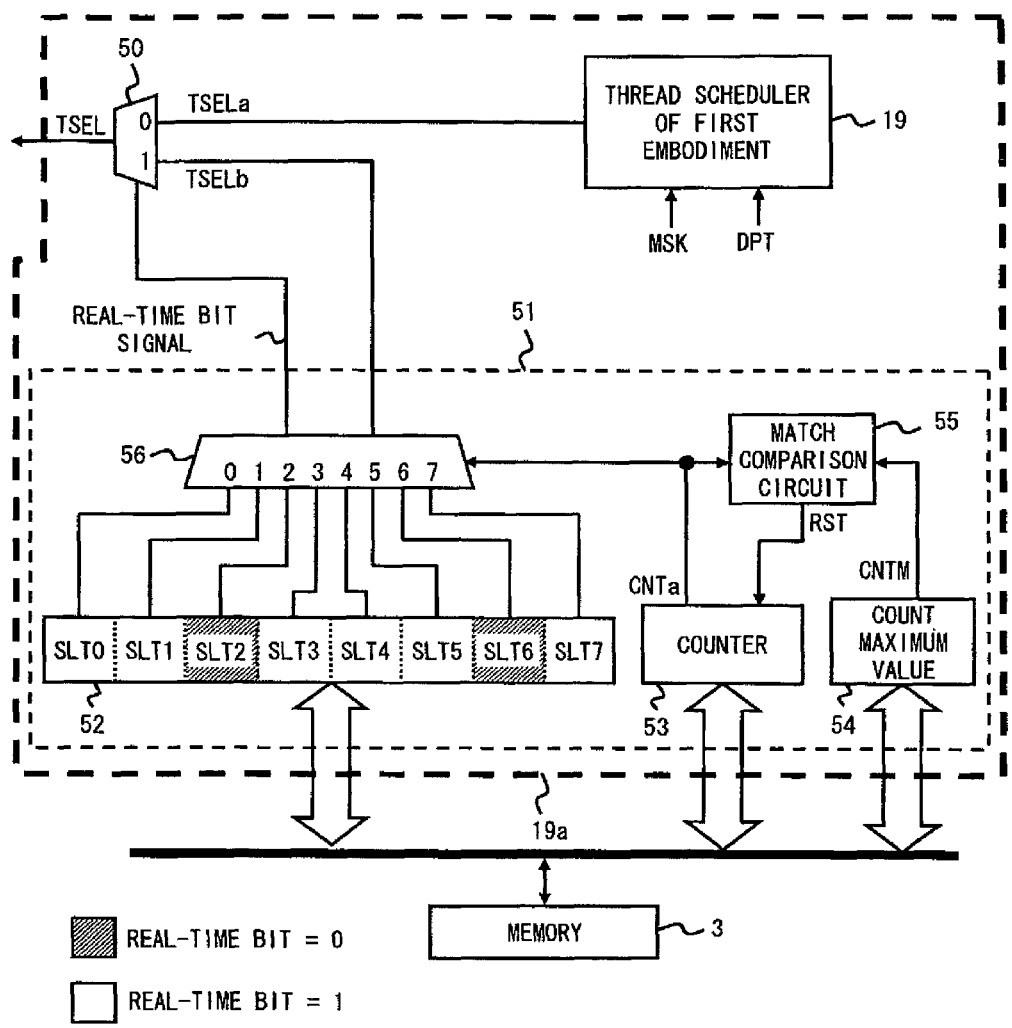
FIG. 12 is a block diagram of a thread scheduler in accordance with a second exemplary embodiment of the present invention.

FIG. 12 shows a block diagram of the thread scheduler 19a. As shown in FIG. 12, the thread scheduler 19a includes a third selector (e.g., selector 50), a first thread scheduler 19, and a second thread scheduler 51. The selector 50 selects one of a first thread selection signal TSELa output from the first thread scheduler 19 and a second thread selection signal TSELb output from the second thread scheduler 51 according to the signal level of the real-time bit signal, and outputs the selected thread selection signal as a thread selection signal TSEL to be supplied to the first selector 18. Note that the first thread selection signal TSELa is the same as the thread selection signal TSEL in the first exemplary embodiment. In order to differentiate the thread selection signals, the thread selection signal output from the first thread scheduler 19 is referred to as "first thread selection signal TSELa" for the sake of convenience in the following explanation. Since the first thread scheduler is the same as the thread scheduler 19 in the first exemplary embodiment, its explanation is omitted.

The second thread scheduler 51 outputs a selection signal (e.g., real-time bit signal) that is used to perform switching between a first execution period and a second execution period, and also outputs a first hardware thread number (e.g., second thread selection signal TSELb) designating a hardware thread that is to be executed in a pre-established execution order during a period in which the real-time bit signal specifies the first execution period. Note that the first execution period means a period during which the real-time bit signal is 1 (which is explained later), and the second execution period means a period during which the real-time bit signal is 0 (which is also explained later). Further, hardware thread numbers to be selected are determined in advance in the first execution period, whereas hardware thread numbers to be selected are arbitrarily determined, for example, by the first thread scheduler 19 in the second execution period. The second thread scheduler 51 includes a thread control register 52, a counter 53, a count maximum value storage unit 54, a match comparison circuit 55, and a selector 56.

Figure 13:
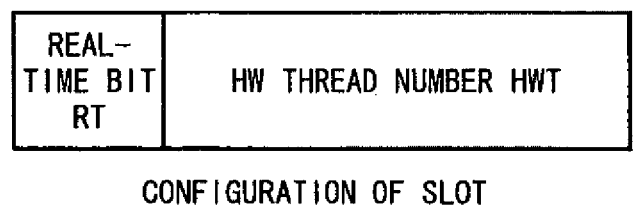
FIG. 13 is a schematic diagram illustrating a configuration of a slot in a second thread scheduler in accordance with a second exemplary embodiment of the present invention.

The thread control register 52 includes a plurality of slots (e.g., slots SLT0 to SLT7). FIG. 13 shows a configuration of the slot. As shown in FIG. 13, each of the slots SLT0 to SLT7 includes a number storage portion in which a hardware thread number HWT is stored, and a real-time bit storage portion in which a period attribute setting flag (e.g., real-time bit RT) that is used to determine the logic level of the real-time bit signal when that particular slot is selected is stored.

The counter 53 updates the count value CNT at predefined intervals. More specifically, the counter 53 in accordance with this exemplary embodiment of the present invention counts up the count value CNTa in synchronization with the operation clock (not shown) of the multi-thread processor 1. The count maximum value storage unit 54 stores a count maximum value CNTM defining the upper limit value of the count value CNTa of the counter 53. The match comparison circuit 55 compares the count value CNTa with the count maximum value CNTM, and when the count value CNTa matches with the count maximum value CNTM, outputs a reset signal RST that resets the count value CNTa of the counter 53. That is, the counter 53 repeats the counting-up action while initializing the count value CNTa at predefined intervals, and thereby outputs the count value CNTa whose value is cyclically updated.

The selector 56 selects one of the slots in the thread control register 52 according to the count value CNTa, and outputs a real-time bit signal and a second thread selection signal TSELb based on a value retained in the selected slot. More specifically, when the count value CNTa is 0, the selector 56 selects the slot SLT0, and uses a hardware thread number retained in the number storage portion for the slot SLT0 as a second thread selection signal TSELb and also uses a real-time bit RT retained in the real-time bit storage portion for the slot SLT0 as the logic level of the real-time bit signal.

Note that values retained in the slots in the thread control register 52 of the second thread scheduler 51, an initial value for the count value CNTa of the counter 53, and a count maximum value CNTM of the count maximum value storage unit 54 are established by the management program that is executed when the multi-thread processor 1 is started up. Further, it is assumed that the management program reads these set values from the memory 2.

Next, operations of the thread scheduler 19a after the normal operation has started are explained hereinafter. Firstly, operations of the second thread scheduler 51 itself are explained. Note that the following explanation is made on the assumption that the initial values for the count value CNT of the counter 53 and the count maximum value CNTM are 0 and 4 respectively as an example of the setting. With regard to values for the respective slots in the thread control register 52, it is also assumed that the real-time bits of the slots SLT0, SLT1, SLT2, SLT4, SLT5, and SLT7 are set to 1, and the real-time values of the slots SLT3 and SLT6 are set to 0. Furthermore, it is also assumed that the hardware thread numbers of the slots SLT0, SLT2, SLT5, and SLT7 are set to 0, the hardware thread numbers of the slots SLT1 and SLT4 are set to 1, and the hardware thread number of the slot SLT3 is set to 2.

FIG. 14 shows a table of hardware thread numbers that the second thread selection signal TSELb output from the second thread scheduler 51 selects under the above-described conditions. The table of FIG. 14 shows in what manner the second thread selection signal TSELb is switched with the lapse of time. Note that timing at which the hardware threads selected by the second thread scheduler 51 are switched is defined as one unit time.

As shown in FIG. 15, if the count value CNT is, at first, 0 at a time t1, the selector 56 selects the slot SLT0. Therefore, the selector 56 sets the logic level of the real-time bit signal to 1 and sets the second thread selection signal TSELb to 0th. Next, the count value CNT is counted up to 1 at a time t2. Therefore, the selector 56 selects the slot SLT1. Accordingly, the selector 56 sets the logic level of the real-time bit signal to 1 and sets the second thread selection signal TSELb to 1st. Next, the count value CNT is counted up to 2 at time t3. Therefore, the selector 56 selects the slot SLT2. Accordingly, the selector 56 sets the logic level of the real-time bit signal to 0 and sets the second thread selection signal TSELb to 1st. Next, the count value CNT is counted up to 3 at time t4. Therefore, the selector 56 selects the slot SLT3. Accordingly, the selector 56 sets the logic level of the real-time bit signal to 1 and sets the second thread selection signal TSELb to 2nd. Next, the count value CNT is counted up to 4 at time t5. Therefore, the selector 56 selects the slot SLT4. Accordingly, the selector 56 sets the logic level of the real-time bit signal to 1 and sets the second thread selection signal TSELb to 1st. Then, since the count value CNTa reaches the count maximum value CNTM at the time t5, the count value CNTa is reset after the lapse of the time t6. In this manner, the second thread scheduler 51 repeats, in the period of the time t6 to t10, the actions performed in the time t1 to t5.

In the second exemplary embodiment of the present invention, the first thread scheduler 19 selects hardware threads that are to be executed in the second execution period specified by the second thread scheduler 51. Therefore, FIG. 15 shows a table showing operations of the thread scheduler 19a in accordance with a second exemplary embodiment of the present invention. Note that the example shown in FIG. 15 uses conditions shown in FIG. 14 as set values of the second thread scheduler 51. Further, it is assumed that the counter initialization values for the first thread scheduler 19 are 2, 1, 3 and 4 in the order from the 0th hardware thread to 3rd hardware thread. That is, in the first thread scheduler of this example, the priority ranks of hardware threads whose executions are not scheduled in the second thread scheduler 51 are made higher than those of the other hardware threads.

As shown in FIG. 15, the second thread scheduler 51 sets the real-time bit signal (RT in the figure) to 0 at the times t3, t9, t13, and t18. Therefore, the thread scheduler 19a uses the first thread selection signal TSELa output from the first thread scheduler 19 at the times t3, t9, t13, and t18. At this point, since the dispatch count value corresponding to the 3rd hardware thread become larger than any other hardware thread at any timing of the times t3, t9, t13, and t18, the first thread selection signal TSELa designates the 3rd hardware thread at each of the times t3, t9, t13, and t18.

Note that the first thread scheduler 19 is notified of the hardware thread that was executed based on the second thread selection signal TSELb output from the second thread scheduler 51 by the dispatch signal DPT. Therefore, the count values CNT0 to CNT3 are decreased during the period of the time t1 to t18. At this point, it is assumed that the lower limit of the count values CNT0 to CNT3 is 0, and thus they are not decreased below that value.

As explained above, in the thread scheduler 19a in accordance with a second exemplary embodiment of the present invention, the first thread scheduler 19 is used to generate the thread selection signal that is used when the second execution period is specified in the second thread scheduler 51. At this point, in the first thread scheduler, the priority ranks of hardware threads are changed so as to reflect the numbers of times the hardware threads are executed based on the operation of the second thread scheduler 51. Therefore, by combining the first thread scheduler 19 with the second thread scheduler 51, it is possible to designate hardware threads for which the numbers of execution times in the second thread scheduler 51 are small by the first thread scheduler 19.

Further, since the hardware threads that are executed in the first execution period are fixed in the first thread scheduler 19, the minimum execution time for the hardware threads can be ensured regardless of the priority ranks of the hardware threads. That is, in accordance with the multi-thread processor 1a in accordance with a second exemplary embodiment of the present invention, the minimum execution time for the hardware threads is ensured by specifying the first execution period by the second thread scheduler 51. Furthermore, by selecting hardware threads by the first thread scheduler 19 in the second execution period, it is possible to preferentially select hardware threads for which the execution frequency is small in the second execution period. That is, in accordance with the multi-thread processor 1a in accordance with a second exemplary embodiment of the present invention, it is possible to prevent the processing of any of the hardware threads from being delayed while ensuring the minimum execution time of the hardware threads.

Note that the present invention is not limited to the above-described exemplary embodiments, and they can be modified as appropriate without departing from the spirit of the present invention. For example, the thread scheduling method in the second scheduler can be changed as appropriate according to the specifications of the multi-thread processor.

The first and second exemplary embodiments can be combined as desirable by one of ordinary skill in the art.

While the invention has been described in terms of several exemplary embodiments, those skilled in the art will recognize that the invention can be practiced with various modifications within the spirit and scope of the appended claims and the invention is not limited to the examples described above.

Further, the scope of the claims is not limited by the exemplary embodiments described above.

Furthermore, it is noted that, Applicant's intent is to encompass equivalents of all claim elements, even if amended later during prosecution.

What is claimed is:
1. A multi-thread processor comprising:
 a plurality of hardware threads each of which generates an independent instruction flow;
 a first thread scheduler that outputs a first thread selection signal, the first thread selection signal designating a hardware thread to be executed in a next execution cycle among the plurality of hardware thread according to priority rank the priority rank being established in advance for each of the plurality of hardware threads;
 a first selector that selects one of the plurality of hardware threads according to the first thread selection signal and outputs an instruction generated by the selected hardware thread; and an execution pipeline that executes an instruction output from the first selector, wherein if the hardware thread is executed in the execution pipeline, the first scheduler modifies the priority rank for the executed hardware thread and updates the highest priority rank by comparing the modified priority rank with the priority ranks of the other hardware threads;

further comprising a second scheduler that specifies execution of at least one hardware thread selected in a fixed manner among the plurality of hardware threads in a predetermined first execution period, and outputs a second thread selection signal specifying execution of an arbitrary hardware thread in a second execution period other than the first execution period and a real-time bit signal indicating one of the first execution period and the second execution period.

2. A multi-thread processor comprising:

a plurality of hardware threads each of which generates an independent instruction flow;

a first thread scheduler that outputs a first thread selection signal, the first thread selection signal designating a hardware thread to be executed in a next execution cycle among the plurality of hardware threads according to a priority rank, the priority rank being established in advance for each of the plurality of hardware threads;

a first selector that selects one of the plurality of hardware threads according to the first thread selection signal and outputs an instruction generated by the selected hardware thread; and an execution pipeline that executes an instruction output from the first selector, wherein if the hardware thread is executed in the execution pipeline, the first scheduler modifies the priority rank for the executed hardware thread and updates the highest priority rank by comparing the modified priority rank with the priority ranks of the other hardware threads;

further comprising a second selector that receives a real-time bit signal, and when the real-time bit signal indicates the first execution period, provides the second thread selection signal to the first selector, and when the real-time bit signal indicates the second execution period, provides the first thread selection signal to the first selector.

3. A multi-thread processor comprising:

a plurality of hardware threads each of which generates an independent instruction flow;

a first thread scheduler that outputs a first thread selection signal, the first thread selection signal designating a hardware thread to be executed in a next execution cycle among the plurality of hardware threads according to a priority rank, the priority rank being established in advance for each of the plurality of hardware threads;

a first selector that selects one of the plurality of hardware threads according to the first thread selection signal and outputs an instruction generated by the selected hardware thread; and an execution pipeline that executes an instruction output from the first selector, wherein if the hardware thread is executed in the execution pipeline, the first scheduler modifies the priority rank for the executed hardware thread and updates the highest priority rank by comparing the modified priority rank with the priority ranks of the other hardware threads wherein the hardware threads that are executed in a first execution period are fixed in the first thread scheduler, and wherein the first selector selects hardware threads by the first thread scheduler in the second execution period to preferentially select hardware threads for which the execution frequency is reduced in the second execution period compared to the first execution period.

4. A multi-thread processor comprising:

a plurality of hardware threads each of which generates an independent instruction flow;

a first thread scheduler that outputs a first thread selection signal, the first thread selection signal designating a hardware thread to be executed in a next execution cycle among the plurality of hardware threads according to a priority rank, the priority rank being established in advance for each of the plurality of hardware threads;

a first selector that selects one of the plurality of hardware threads according to the first thread selection signal and outputs an instruction generated by the selected hardware thread; and an execution pipeline that executes an instruction output from the first selector., wherein if the hardware thread is executed in the execution pipeline, the first scheduler modifies the priority rank for the executed hardware thread and updates the highest priority rank by comparing the modified priority rank with the priority ranks of the other hardware threads, and wherein when a hardware thread that is scheduled to be selected by the first selector cannot be selected due to a state of the execution pipeline, the first thread scheduler recognizes the state of the execution pipeline by a mask signal, and then the first thread scheduler selects a hardware thread other than the hardware thread notified by the mask signal.

5. A hardware thread scheduling method in a multi-thread processor, the multi-thread processor comprising a plurality of hardware threads and being configured to execute an instruction flow generated by the hardware thread while switching the hardware thread in accordance with a predefined schedule, the hardware thread scheduling method comprising:

selecting, according to a first thread selection signal, a hardware thread having a highest priority rank among the plurality of hardware threads;

executing an instruction generated by the selected hardware thread;

updating the priority rank of the hardware thread that generated the executed instruction; and selecting, according to the first thread selection signal, the hardware thread having a highest priority rank among the updated priority ranks as the hardware thread that generates an instruction next., wherein an execution pipeline executes the instruction output, wherein if the hardware thread is executed in the execution pipeline, the first scheduler modifies the priority rank for the executed hardware thread and updates the highest priority rank by comparing the modified priority rank with the priority ranks of the other hardware threads, and wherein when a hardware thread that is scheduled to be selected by the first selector cannot be selected due to a state of the execution pipeline, the first thread scheduler recognizes the state of the execution pipeline by a mask signal, and then the first thread scheduler selects a hardware thread other than the hardware thread notified by the mask signal.

* * * * *